(12) United States Patent
Thijssen et al.

(10) Patent No.: US 9,513,850 B2
(45) Date of Patent: Dec. 6, 2016

(54) METHOD FOR MIXING PAPER ORIENTATIONS

(71) Applicant: OCÉ-TECHNOLOGIES B.V., Venlo (NL)

(72) Inventors: Abraham Thijssen, Venlo (NL); Antonius M. Gerrits, Venlo (NL)

(73) Assignee: OCÉ-TECHNOLOGIES B.V., Venlo (NL)

( * ) Notice: Subject to any disclaimer, the term of this patent is extended or adjusted under 35 U.S.C. 154(b) by 0 days.

(21) Appl. No.: 14/839,365

(22) Filed: Aug. 28, 2015

(65) Prior Publication Data

US 2016/0062710 A1 Mar. 3, 2016

(30) Foreign Application Priority Data

Aug. 29, 2014 (EP) ..................................... 14182776

(51) Int. Cl.
*G06F 15/00* (2006.01)
*G06F 3/12* (2006.01)
*G06K 15/00* (2006.01)
*B41J 3/60* (2006.01)
*B41J 11/48* (2006.01)
*B41J 13/00* (2006.01)
*H04N 1/00* (2006.01)

(52) U.S. Cl.
CPC ............... *G06F 3/1206* (2013.01); *B41J 3/60* (2013.01); *B41J 11/485* (2013.01); *B41J 13/0009* (2013.01); *G06F 3/125* (2013.01); *G06F 3/1258* (2013.01); *G06K 15/005* (2013.01); *G06K 15/4065* (2013.01); *H04N 1/00408* (2013.01)

(58) Field of Classification Search
CPC .................................................. G06F 3/1206
USPC ....................................................... 358/1.12
See application file for complete search history.

(56) References Cited

U.S. PATENT DOCUMENTS

| | | | |
|---|---|---|---|
| 6,283,653 B1 | 9/2001 | Higuchi | |
| 2008/0152375 A1* | 6/2008 | Kadota | G03G 15/50 399/81 |
| 2011/0242584 A1* | 10/2011 | Igarashi | G06F 3/1205 358/1.15 |
| 2012/0201548 A1* | 8/2012 | Nakai | G03G 15/234 399/16 |
| 2012/0201549 A1* | 8/2012 | Sakata | G03G 15/6591 399/16 |
| 2013/0321863 A1* | 12/2013 | Fukuda | B65H 3/44 358/1.15 |
| 2014/0037301 A1* | 2/2014 | Tanaka | G03G 13/16 399/23 |
| 2014/0159306 A1* | 6/2014 | Nonaka | B65H 29/60 271/288 |
| 2015/0062635 A1* | 3/2015 | Anno | G06K 15/4065 358/1.15 |

* cited by examiner

*Primary Examiner* — Tammy Paige Goddard
*Assistant Examiner* — Mark Milia
(74) *Attorney, Agent, or Firm* — Birch, Stewart, Kolasch & Birch, LLP (57) ABSTRACT

A method for loading image receiving material in a printing system, the printing system including a print engine capable of printing on the image receiving material, a control unit for controlling the printing on the image receiving material, at least one input holder for loading the image receiving material, and a user interface for interacting with a user of the printing system, includes the steps of receiving by means of the user interface a setting for a facial orientation of an image receiving material in the at least one input holder, the facial orientation being one out of a face up orientation and a face down orientation, storing the setting of the facial orientation as an attribute of the at least one input holder, and detecting the image receiving material loaded in the at least one input holder. A printing system is configured to execute the method.

6 Claims, 9 Drawing Sheets

Fig. 1

| Medium input orientation | Plexity | Medium output orientation | Possible? | How? |
|---|---|---|---|---|
| Face-down | Simplex | Face up | yes | Print front and then deposit |
| Face-down | Simplex | Face down | yes | Print front then turn and then deposit |
| Face-down | Duplex | Face up | no | Workaround: print back then front and then deposit: wrong output for oriented image receiving material |
| Face-down | Duplex | Face down | yes | Print front then back and then deposit |

Fig. 2a (Prior art)

| Medium input orientation | Plexity | Medium output orientation | Possible? | How? |
|---|---|---|---|---|
| Face-up | Simplex | Face up | yes | Print empty front then back and then deposit: productivity loss |
| Face-up | Simplex | Face down | yes | Print empty front then back then turn and then deposit: productivity loss |
| Face-up | Duplex | Face up | yes | Print back then front and then deposit |
| Face-up | Duplex | Face down | no | Workaround: print front then back and then deposit: wrong output for oriented image receiving material |

| Medium input orientation | Plexity | Medium output orientation | Possible? | How? |
|---|---|---|---|---|
| Face-down | Simplex | Face up | yes | Print front and then deposit |
| Face-down | Simplex | Face down | yes | Print front then turn and then deposit |
| Face-down | Duplex | Face down | yes | Print front then back and then deposit |

Fig. 6a

| Medium input orientation | Plexity | Medium output orientation | Possible? | How? |
|---|---|---|---|---|
| Face-up | Duplex | Face up | yes | Print back then front and then deposit |

METHOD FOR MIXING PAPER ORIENTATIONS

CROSS-REFERENCE TO RELATED APPLICATIONS

This application claims priority under 35 U.S.C. §119(a) to Application No. 14182776.6, filed in Europe on Aug. 29, 2014. The entire contents of each of the above-identified applications are hereby incorporated by reference into the present application.

BACKGROUND OF THE INVENTION

1. Field of the Invention

The present invention relates to a method for loading image receiving material in a printing system, the printing system comprising a print engine capable of printing on the image receiving material, a control unit for controlling the printing on the image receiving material, at least one input holder for loading the image receiving material, and a user interface for interacting with a user of the printing system.

The present invention further relates to a print system, which is configured to apply the method according to the present invention and a non-transitory computer readable medium comprising computer executable program code configured to instruct a computer to perform the method according to the present invention.

2. Description of Background Art

According to U.S. Pat. No. 6,283,653 it is checked to see if there is image receiving material loaded in a current input holder.

In a productive print system, it is important that images comprised in a print job are printed on the correct side of a sheet. This is dependent on how the sheets are put into the input holder. Each sheet has two sides or so-called faces, a front side and a rear side. For example the facial orientation of the sheet may be a face up orientation or a face down orientation. The face up orientation is an orientation having the front side of the sheet upwards in the input holder. The face down orientation is an orientation having a front side of the sheet downwards in the input holder. A face up orientation and a face down orientation may be defined similarly for an output holder for holding printed image receiving material. For example, the header orientation of the sheet may be a header up orientation or a header down orientation. The header up orientation is an orientation having a pre-printed header of the sheet on a top side of the sheet. The header down orientation is an orientation having the pre-printed header of the sheet on a side of the sheet opposite to the top side of the sheet by rotation of the sheet by $\pi$ radians in the plane of the sheet. A header up orientation and a header down orientation may be defined similarly for an output holder for holding printed image receiving material.

In particular, oriented image receiving material such as pre-printed image receiving material, pre-punched image receiving material or one-sided coated image receiving material has to be loaded into the input holder of the printing system in the appropriate way to complete the print job in the correct way. Even normal image receiving material, like plain paper, may have small differences in the faces of the image receiving material and may be characterized as an oriented image receiving material. When printing with an inkjet printing system, marking material ejected on the front side or the rear side may have different ink blotting properties on the respective sides. Therefore the face up loading or face down loading of the image receiving material in the input holder may lead to different print quality results on the sides of a sheet.

A fill receipt for a print job with respect to a prescribed facial orientation of the image receiving material to be loaded in the input holder has to be input by the operator of the printing system for a print job for oriented image receiving material. Such a fill receipt may be indicated with adhesive labels for different kinds of image receiving material in an input holder. Such a fill receipt for the print job may be always face up or always face down, dependent on the kind of printing system. This way of working lacks flexibility of input and prevents a print job that uses only one image receiving material, which needs a face up orientation for one part of the print job and a face down orientation for another part of the print job, such as a mix-plex print job. A mix-plex print job is a print job having partly a simplex plexity and partly a duplex plexity. This way of working may even prohibit a kind of print job on oriented image receiving material, which print job needs a duplex print mode and a specific output orientation in an output holder of the printing system.

Image receiving material may also be called medium. An example of an input holder is an input tray, a container or a cassette, but other input holders may be envisioned. An example of an output holder is an output tray, a container or a cassette, but other output holders may be envisioned.

SUMMARY OF THE PRESENT INVENTION

According to the present invention, the method of loading image receiving material in a printing system, is improved by the steps of:

receiving, by means of the user interface, a setting for a facial orientation of an image receiving material in the at least one input holder, the facial orientation being one of a face up orientation and a face down orientation;

storing the setting of the facial orientation as an attribute of the at least one input holder in the control unit; and detecting the image receiving material loaded in the at least one input holder.

The user interface is configured to have a menu or hardware buttons for the operator to enter a facial orientation setting as an attribute of the input holder in a storage of the control unit of the printing system. When the operator has the intention to run a print job with oriented image receiving material, he enters the facial orientation setting for the input holder and the system knows for further print jobs that the loaded image receiving material has been loaded face up or face down in the input holder according to the facial orientation setting.

According to a further embodiment, the method further comprises the steps of:

receiving, by means of the user interface, a setting for a header orientation of the image receiving material in the at least one input holder, the header orientation being one of a header up orientation and a header down orientation; and storing the setting of the header orientation as an attribute of the at least one input holder.

A header orientation is an orientation of the sheet in the input holder in an x-y plane parallel to a surface of the image receiving material in the input holder. While the facial orientation of the sheet may be interpreted as an orientation of the sheet in a z plane in the input holder perpendicular to the surface of the image receiving material in the input holder, the header orientation has two variants for each facial orientation called header up and header down for a LEF orientation of a sheet and header right and header left for a SEF orientation of a sheet. The LEF/SEF orientation is a further orientation of a sheet. The LEF/SEF orientation of a sheet determines if a long edge feed (LEF) is required for a sheet to be input in the input holder or a short edge feed (SEF) is required for a sheet to be input in the input holder. A printing system is capable of loading image receiving material in either a LEF way or in a SEF way or in both ways. Printing systems are known where the user can indicate a LEF/SEF orientation when loading the image receiving material in an input holder of the printing system. The overall orientation of a sheet is completely determined by the combination of the facial orientation, the header orientation and the LEF/SEF orientation. A header orientation can be visualized by a zero radians or a $\pi$ radians rotation of a sheet in the x-y plane, while a LEF/SEF orientation can be visualised by a $\frac{1}{2}\pi$ radians or $1\frac{1}{2}\pi$ radians rotation of a sheet in the x-y plane.

The user interface is configured to have a menu for the operator to enter a header orientation setting as an attribute of the input holder in a storage of the control unit of the printing system. When the operator has the intention to run a print job with oriented image receiving material he enters the header orientation setting for the input holder and the system knows for further print jobs on the same oriented image receiving material that the loaded image receiving material has been loaded header up or header down in the input holder according to the header orientation setting.

According to an embodiment of the method, information about the image receiving material is comprised in a digital data list of image receiving materials, the method further comprises the steps of:

storing the setting of the facial orientation in the digital data list as an attribute of the image receiving material; and storing a setting indicating that the image receiving material is an oriented image receiving material in the digital data list as an attribute of the image receiving material.

Such a digital data list may be a media catalogue in a memory of the control unit of the printing system. The control system knows that a certain image receiving material is an oriented image receiving material and can act accordingly.

According to an embodiment of the method, information about the image receiving material is comprised in a digital data list of image receiving materials, the method further comprises the step of:

storing the setting of the header orientation in the digital data list as an attribute of the image receiving material.

Such a digital data list may be a media catalogue in a memory of the control unit of the printing system.

According to an embodiment of the method, the detected loaded image receiving material is a rectangular oriented image receiving material. The rectangular image receiving material may have an appropriate size, like A3, A4, A5, B3, B4, B5, Letter, Legal, Folio, etc. The rectangular image receiving material is oriented because it is pre-printed, one-sided coated, or pre-punched, otherwise perforated or a combination of at least two of these pre-features. The rectangular image receiving material may also be normal plain image receiving material, which is produced in the image receiving material factory in such a way that the faces of each sheet of the image receiving material have different properties, for example with respect to the absorption and/or blotting of marking material like ink and toner. It is noted that tab sheets are not covered by the term rectangular oriented image receiving material and do need special treatment in a printing system, which special treatment is due to the non-rectangular shape of the tab sheet and is not in the scope of the present invention.

According to an embodiment of the method, the printing system comprises a plurality of input holders comprising a first input holder for loading the oriented rectangular image receiving material and a second input holder for loading the same oriented rectangular image receiving material, the method further comprising the steps of:

Receiving, by means of the user interface, a first setting of the facial orientation of the image receiving material loaded or intended to be loaded in the first input holder;

storing the first setting of the facial orientation as an attribute of the first input holder;

detecting the image receiving material loaded in the first input holder;

receiving, by means of the user interface, a second setting of the facial orientation of the image receiving material loaded or intended to be loaded in the second input holder;

storing the second setting of the facial orientation as an attribute of the second input holder; and detecting the image receiving material loaded in the second input holder, wherein a value of the first setting is different from a value of the second setting.

The method achieves that image receiving material of the same kind is loaded face up in a first input holder and face down in the second input holder and that the respective facial orientations are registered in the printing system for the first and second input holder. By having at least two input holders having the same image receiving material with a different facial orientation and the printing system knowing the orientation of the image receiving material in the first and second input holder, respectively, the printing system always has the image receiving material at its disposal in both orientations.

This is in particular advantageous when printing of a print job in a simplex mode or a duplex mode with a prescribed output facial orientation when printed by means of the print engine—a face up or a face down output facial orientation in the output holder of the printing system. By doing so, it is not necessary to use a workaround of adding turning stations between an input section of the printing system and a print section of the printing system or between the print section of the printing system and the output section of the printing system or by using duplex turning. This workaround would make the printing system more complex and more expensive. By using a turning station for duplex printing, only the productivity of the printing system may diminish as will be further elucidated in the detailed description of the embodiments hereinafter.

It is also not necessary to use another cumbersome workaround of defining the same image receiving material as two different image receiving materials, loading this image receiving material face up or face down and performing such media programming for mix-plex print jobs that the printing system will take the correctly oriented sheets from the correct input holders. This workaround may also give rise to a loss of productivity of the printing system and may give the operator extra work. Due to the present invention, the operator does not need to know how to load the image receiving material when only one facial orientation is needed. The control unit requests for the image receiving material in the needed facial orientation.

According to an embodiment of the method, the printing system comprises an output holder for outputting a printed image receiving material, the method further comprises the steps of:

receiving a print job to be printed on the same oriented rectangular image receiving material as loaded in the first and second input holder, the print job specifying a target document having a plexity of the print job and an output facial orientation of the printed image receiving material in the output holder, when the print job is printed, determining an input holder out of the first and second input holder on the basis of the specified plexity of the target document and the specified output facial orientation of the printed image receiving material in the output holder from which determined input holder of the first and second input holders the oriented rectangular image receiving material is going to be used for printing the print job; and printing the print job on the oriented rectangular image receiving material from the determined input holder.

The plexity of the print job may be a simplex plexity, a duplex plexity or a mixed plexity of a simplex part and a duplex part. The plexity of the target document may differ per page of the target document. Using the facial orientation of the image receiving material in the input holders, a knowledge of which sheets the printing system can turn and the structure of the print job, the control unit of the printing system determines whether to use image receiving material from the first input holder or from the second input holder or from both the first and second input holder to achieve the desired target document. According to the background art, not all combinations of plexity—simplex printing or duplex printing—and a specified facial orientation in the output holder—face up or face down—are realizable by a printing system with image receiving material loaded in the input holder(s) in one facial orientation. This embodiment of the method is advantageous, since all combinations of plexity—simplex printing or duplex printing or mix-plex printing—and facial orientation in the output holder are realizable with image receiving material loaded in the first and second input holder according to this embodiment of the invented method.

According to an embodiment, the method further comprises the steps of:

displaying a warning by means of the user interface of the printing system if the determined input holder of the first and second input holders contains an amount of the oriented rectangular image receiving material, which amount is insufficient for completing the print job or the oriented rectangular image receiving material is not present in the determined input holder; and starting printing of the print job after receiving an electronic signal that a sufficient amount of oriented rectangular image receiving material has been loaded in the determined input holder for completing the print job, wherein the warning comprises a fill receipt with respect to the facial orientation for filling the determined input holder.

The present invention also relates to a printing system for printing an image on an image receiving material, the system being configured to execute any method according to the present invention.

The present invention also relates to a non-transitory computer readable medium comprising computer executable program code configured to instruct a computer to perform any method according to the present invention.

Further scope of applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The present invention will now be described with reference to the accompanying drawings, wherein the same reference numerals have been used to identify the same or similar elements throughout the several views.

Figure 1:
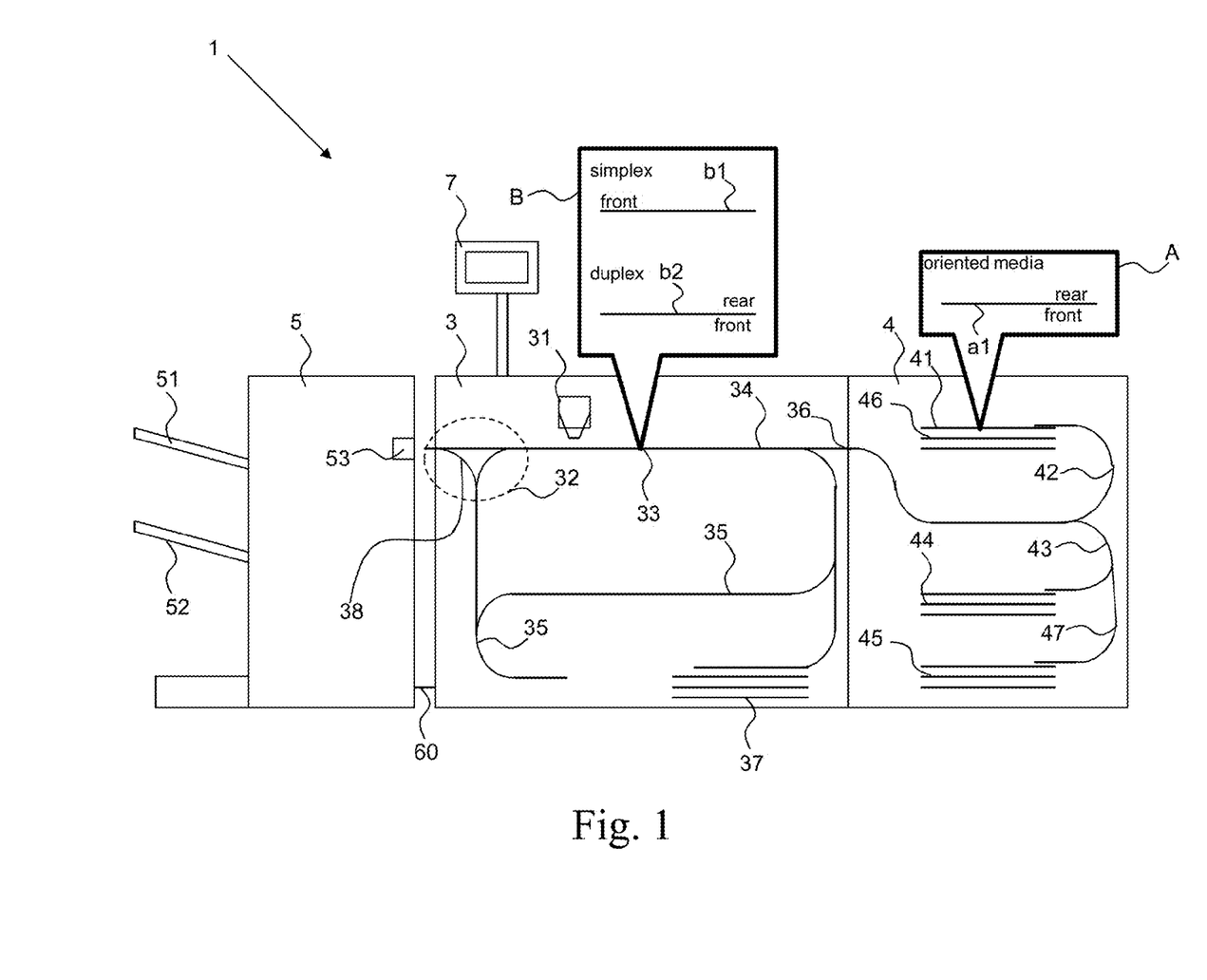
FIG. 1 schematically illustrates a printing system in which the method according to the present invention is applicable.

FIG. 1 schematically illustrates a printing system 1 in which the method according to the present invention is applicable. The printing system 1 comprises an output section 5, a print engine and control section 3, possibly containing one or more input sections 37, a local user interface 7 and an input section 4.

The output section 5 comprises two output holders 51, 52 for holding printed image receiving material. The printed image receiving material is transported from the print engine and control section 3 via an inlet 53 to the output section 5. It is assumed that sheets of image receiving material are deposited in the output holders 51, 52 in a same position with respect to the front and rear side of the sheets as the sheets arrive at the inlet 53 of the output section 5. The output section 5 is digitally connected by means of a cable 60 to the print engine and control section 3 for bi-directional data signal transfer.

The print engine and control section 3 comprises a print engine and a control unit (not shown) for controlling the printing process. The control unit is a computer or server or a workstation, connected to the print engine and connected to the digital environment of the printing system, for example a network for transmitting a submitted print job to the printing system. The print engine comprises a print head or print assembly 31 for ejecting or fixing marking material to the image receiving material and a paper path 34, 32, 35 for transporting the image receiving material from an entry point 36 of the print engine and control section 3 to the inlet 53 of the output section 5. The print head or print assembly 31 is positioned near the paper path section 34. While an image receiving material is transported along the paper path section 34, the image receiving material receives the marking material from the print head or print assembly 31. A next paper path section 32 is a flip unit for selecting a different subsequent paper path for simplex or duplex printing of the image receiving material. The flip unit 32 may be also used to flip a printed sheet of image receiving material after printing in simplex mode before the printed sheet leaves the print engine and control section 3 via a curved section 38 of the flip unit 32 and via the inlet 53 to the output section 5. In another embodiment of the printing system, the curved section 38 of the flip unit 32 is not present and the turning of a simplex page has to be done via another paper path section 35, and leads to productivity loss. In another embodiment of the printing system, an additional turning station—partly to replace the curved section 38 of the flip unit 32—is configured outside the print engine and control section 3 between the print engine and control section 3 and the output section 5.

When the image receiving material has to be printed in a simplex mode, the image receiving material may be directly transported via the flip unit 32 to the inlet 53 of the output section 5. The position of the image receiving material at a point 33 on the paper path section 34 is shown in a note box B as a sheet b1 having the front side upwards.

When the image receiving material has to be printed in a duplex mode, the image receiving material is transported via the flip unit 32 to the other paper path section 35 for turning the image receiving material in order to switch the front side and the back side of the sheets. The sheets are then transported to the paper path section 34 again for printing on the rear side of the sheets by means of the print head or print assembly 31. A position of the image receiving material at the point 33 on the paper path section 34 is shown in a note box B as a sheet b2 having the front side downwards and the rear side of the sheet upwards. After printing on the image receiving material, the sheets are transported to the inlet 53 of the output section 5.

The print engine and control section 3 also comprises an additional input holder 37 for holding image receiving material. Image receiving material may have to be input in the additional input holder 37 in another orientation than an input orientation for the input holders 44, 45, 46 (not shown).

The input section 4 comprises a plurality of input holders 44, 45, 46 for holding the image receiving material before transporting the sheets of image receiving material to the print engine and control section 3. A position 41 of the image receiving material in the input holder 46 is shown in a note box A as a sheet a1 having the front side downwards and the rear side of the sheet upwards. Sheets of image receiving material are guided from the input holders 44, 45, 46 by guides 42, 43, 47 to an outlet 36 for entrance in the print engine and control section 3. Sheets of image receiving material are now guided from the input holders 44, 45, 46 to the right side of the input holders 44, 45, 46, but other configurations of the input holders may be envisioned for at least partly guiding the sheets to the left side. For these other configurations, a suitable instruction for face up or face down loading of the image receiving material in the respective input holder will be generated by the control unit. While guiding the sheets, the guides 42, 43, 47 will turn the sheets upside down. In this way, sheets arrive at the outlet 36 in a position with the front side of the sheet upwards as indicated by the sheet b1 in the note box B.

The distinction between a rear and a front side of a sheet is significant for printing, since the sheet is produced as an oriented image receiving material with a different rear and front side as already defined in the background section of this application.

A problem occurs when sheets of receiving material in the input holders 44, 45, 46 all have the same position as indicated in note box A.

In case of simplex printing, the position of a sheet at the print head or print assembly 31 will be according to the position of sheet b1 in the note box B. Sheet b1 has the front side of the sheet directed upwards. If an output orientation of the printed sheets in the output holder 51, 52 is specified to be in a face up orientation, the sheet may be transported from the print head or print assembly 31 straight forward to the inlet 53 of the output section 5. The sheets will arrive in a face up orientation at the inlet 53 and in a face up orientation in one of the output holders 51, 52.

If an output orientation of the printed sheets in the output holder 51, 52 is specified to be in a face down orientation, the sheet may be transported from the print head or print assembly 31 to the flip unit 32, which turns the sheets upside down and reverts the direction of transport of the sheets upwards towards the inlet 53 of the output section 5 before the sheets arrive at the other paper path section 35. The sheets will arrive in a face down orientation at the inlet 53 and in a face down orientation in one of the output holders 51, 52.

In case of duplex printing, the position of a sheet at the print head or print assembly 31 will be according to the position of the sheet b2 in the note box B. Sheet b2 has the front side of the sheet directed downwards and the rear side of the sheet directed upwards, meaning a face down orientation of the sheet b2. The sheet may be transported from the print head or print assembly 31 straight forward to the inlet 53 of the output section 5. The sheets will arrive in a face down orientation at the inlet 53 and in a face down orientation in one of the output holders 51, 52. This is the correct result if the output orientation was specified to be face down.

If the output orientation was specified to be in a face up orientation, the printing system is not able to deliver the sheets in the output section in the face up orientation. Note that it is inconvenient to use the flip unit 32 in a duplex mode without loss of productivity, since a next sheet may jam with a sheet currently being flipped in the flip unit 32 and/or a very complex scheduling of sheets in the duplex loop 35 has to be realized.

Therefore it is inconvenient or not possible to deliver a duplex printed sheet in a face up orientation in the output holders 51, 52. These combinations of input and output orientations of the image receiving material in the input holders and output holders, respectively are shown in a table in FIG. 2a.

It is noted that, if the image receiving material was loaded in the input holders 44, 45, 46 in a face up orientation, the printing system is not able to deliver a duplex printed sheet in a face down orientation in one of the output holders 51, 52. These combinations of input and output orientations of the image receiving material in the input holders and output holders, respectively are shown in a table in FIG. 2b. FIG. 3 shows a user interface window 300 of a printing system reflecting the method according to the present invention. In an alternative embodiment, part of the functionality—like buttons—of this user interface window is designed as hardware buttons near the user interface window 300. The user interface window 300 is opened at a user interface screen 7 in FIG. 1 when image receiving material is added to an input holder. The user interface window 300 comprises a title section 316, an input holder section 301, an orientation settings section 317, an image receiving material list section 309 and a navigation section 318.

The input holder section 301 shows an input holder identification section 319 comprising the number 2 of the opened input holder, and a specification section 302 comprising attributes of the image receiving material present in the input holder numbered 2. The attributes comprise an orientation indication, a size, a weight, a type and a color of the image receiving material. The orientation indication only consist of a LEF/SEF indication, since the image receiving material in the input holder numbered 2 is just A4, 100 g/m², TopColor, White. With respect to this image receiving material, the facial orientation and the header orientation usually are of no concern for the image quality of the job to be printed on this image receiving material.

The orientation settings section 317 comprises a LEF orientation button 305, a SEF orientation button 306, a face up orientation button 303, a face down orientation button 304, a header up orientation button 314 and a header down orientation button 315. A user or an operator can touch by hand or by mouse click one of the LEF/SEF orientation buttons 305, 306, one of the facial orientation buttons 303, 304 and one of the header orientation buttons 314, 315 in order to completely determine the orientation of the image receiving material in the input holder numbered 2. A default setting for each of the LEF/SEF orientation, the facial orientation and the header orientation may be set in order to accelerate the selection of the appropriate orientation settings. The buttons 314, 304, 305 for default settings for the sheet orientations in user interface window 300 are visualized by broad edges of the circumventing rectangles.

The image receiving material list section 309 comprises a list 319 of selectable image receiving materials 307, 308, 320. The list 319 is scrollable by means of an upward scrolling button 310 and a downward scrolling button 311. An image receiving material may be selected from the list 319 in order to specify that the image receiving material selected from the list 319 is present or is going to be loaded into the input holder numbered 2. The input holder numbered 2 is selected on a previous user interface screen (not shown) comprising the set of all input holders of the printing system. When an image receiving material is selected from the list 319, the specification section 302 is adapted. The list 319 also comprises an oriented image receiving material 320 of Océ logo paper.

The navigation section 318 comprises an OK button 312 to confirm and activate selections made by the user or operator at the orientations settings section 317 and at the image receiving material list section 309. The navigation section 318 also comprises a cancel button 313 to cancel the selections made by the operator on the user interface window 300.

Figure 3:
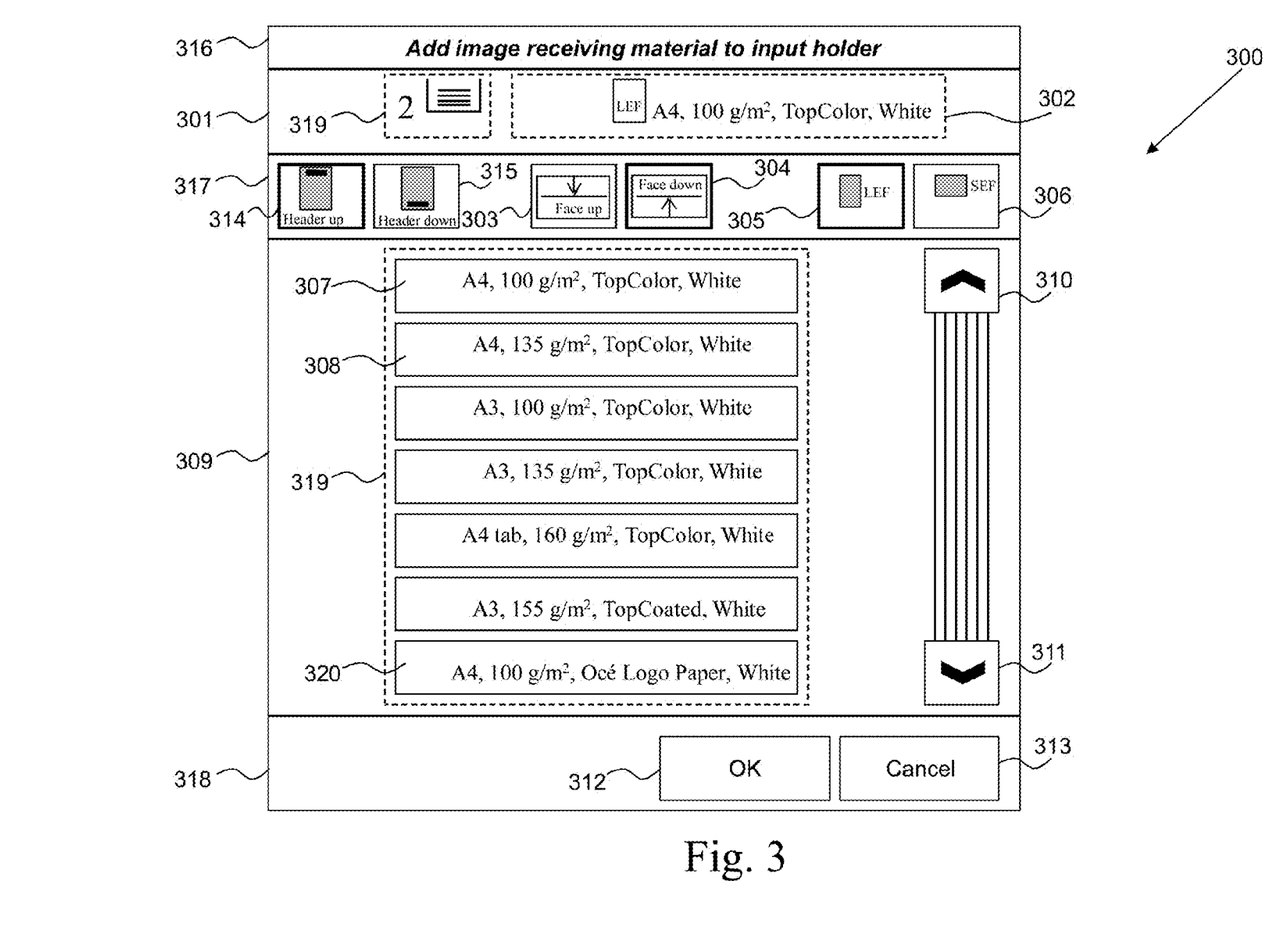
FIGS. 3-4 illustrates user interface windows of a printing system reflecting the method according to the present invention.
Figure 4:
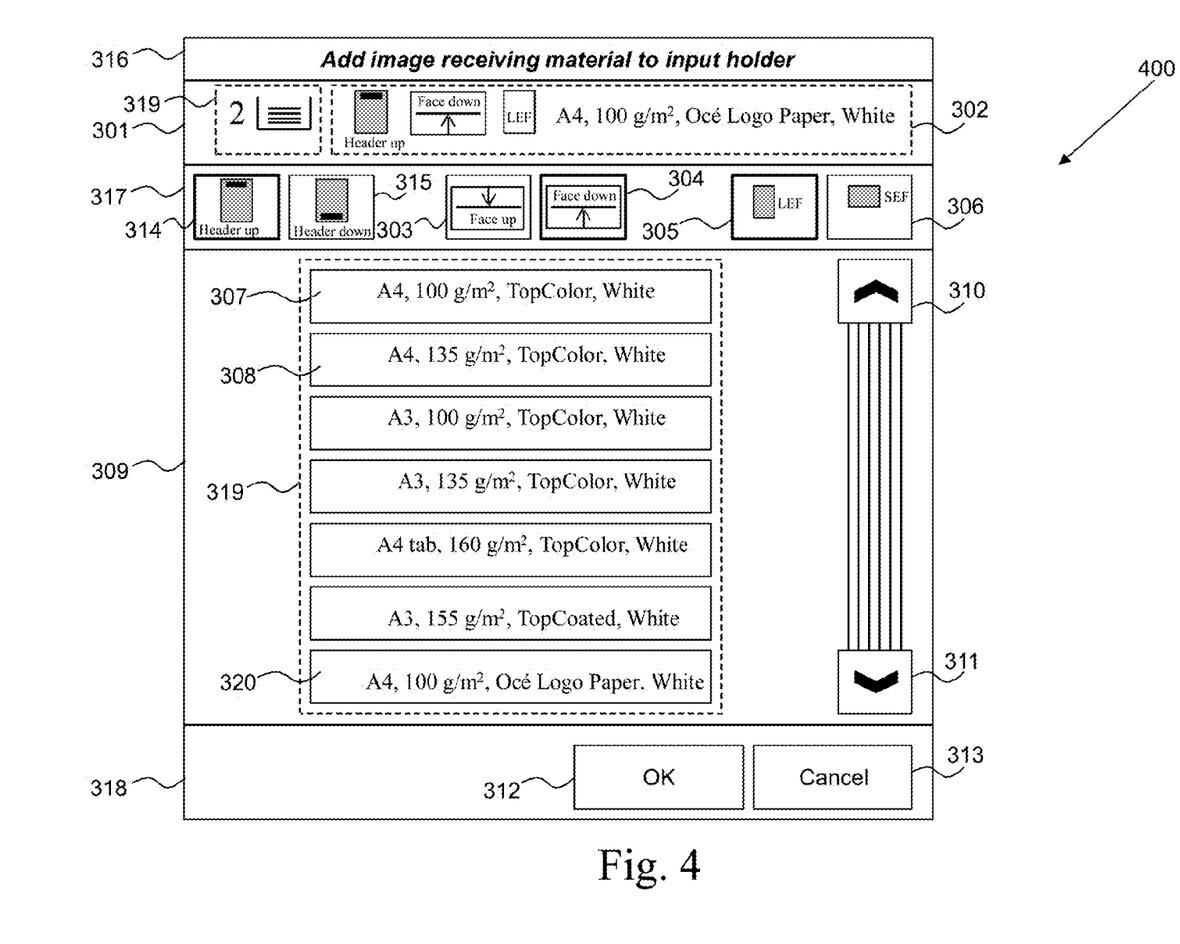

When the oriented image receiving material 320—Océ logo paper—is selected from the list 319, the user interface window 300 changes into the user interface window 400 shown in FIG. 4. The selected image receiving material 320 is displayed in the specification section 302. The specification section 302 now also comprises all three orientation settings—LEF/SEF orientation, header up/down orientation and face up/down orientation. These three orientation settings are rather relevant for the selected Océ logo paper, since Océ logo paper is an oriented image receiving material. If the LEF/SEF orientation is defaulted by the printing system, the LEF orientation button 305 and the SEF orientation button 306 may be omitted from the orientation settings section 317 on the user interface window 400. If the header up/down orientation is defaulted by the printing system, the header up orientation button 314 and the header down orientation button 315 may be omitted from the orientation settings section 317 on the user interface window 400.

Figure 5:
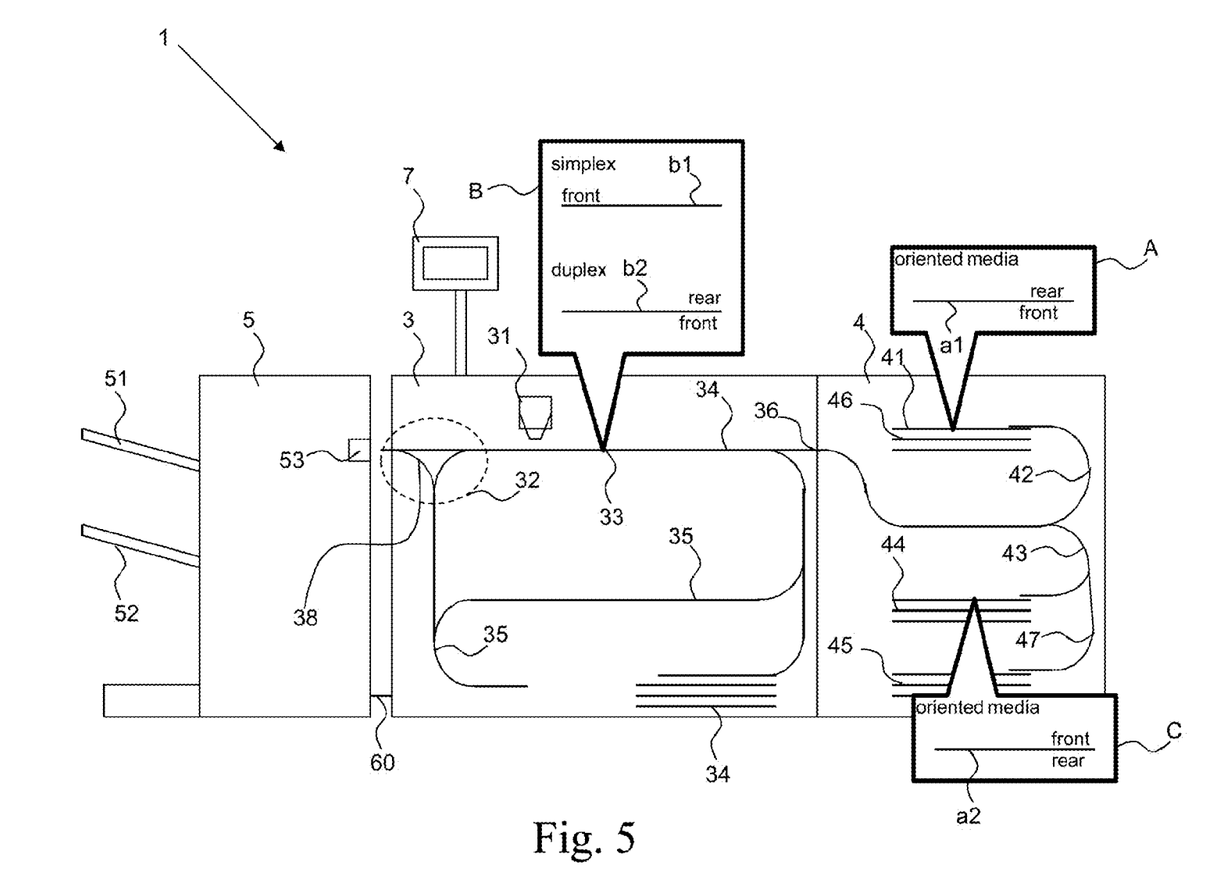
FIG. 5 schematically illustrates the printing system in which image receiving material is loaded according to the method of the present invention.

According to the method of the present invention, the same image receiving material is loaded into the input holder 46 in an orientation as in note box A, sheet a1, in FIG. 5 (same as in FIG. 1) and into the input holder 44 (or 45) in the other orientation as in note box C in FIG. 5. A sheet a2 in the input holder 44 has a front side directed upwards in the input holder 44 and a rear side directed downwards in the input holder 44. The loading process of the image receiving material in an input holder 44, 45, 46 comprises a step of registering the facial orientation—face up or face down—of the loaded or to be loaded sheets. The user interface window 300 shown in FIG. 3—see also user interface window 400 in FIG. 4—enables the registration of the facial orientation of the image receiving material. The control unit of the printing system knows the facial orientation of the sheets in each input holder 44, 45, 46.

According to the example mentioned here-above, the printing system is now also able to deliver a duplex printed sheet in a face up orientation in one of the output holders 51, 52 by extracting the sheets from the input holder 44 instead of from the input holder 46. The sheets are extracted from the input holder 44 in a face up position and are turned to a face down position at the outlet 36. The information specified to be printed on the rear side of the sheet should first be printed on the sheet in the paper path section 34 by means of the print head or print assembly 31. Then the sheet enters, via the flip over unit 32, the other paper path section 35 and arrives at the paper path section 34 again in a face up position for printing the information specified for the front side of the sheet by means of the print head or print assembly 31. The sheet leaves the print engine and control section 4 in a face up position and will arrive via the inlet 53 in one of the output holders 51, 52 in a face up orientation as was specified by the user.

Figure 6A:
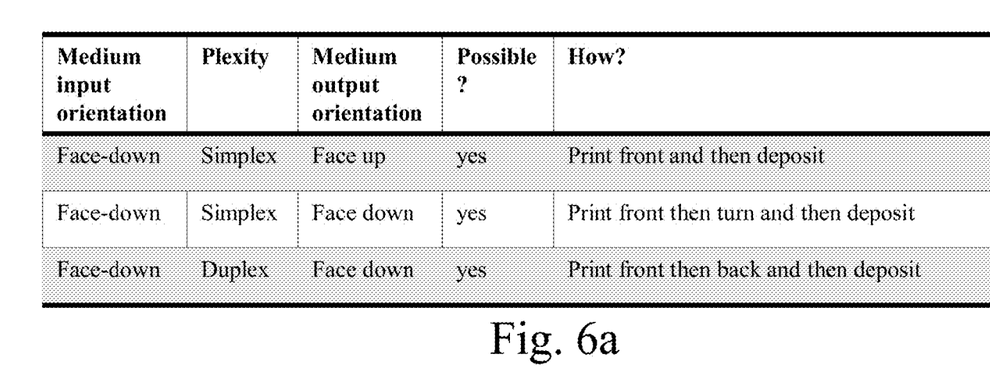
FIGS. 6a-6b are tables of input and output orientations of image receiving material according to the present invention.
Figure 6B:
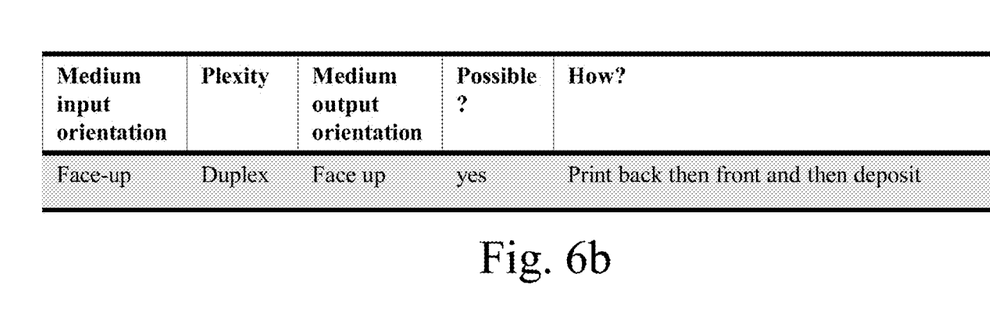

The combinations of input and output orientations of the image receiving material in the input holders and output holders, respectively according to the present invention are shown in a table in FIGS. 6a-6b.

Figure 2A:
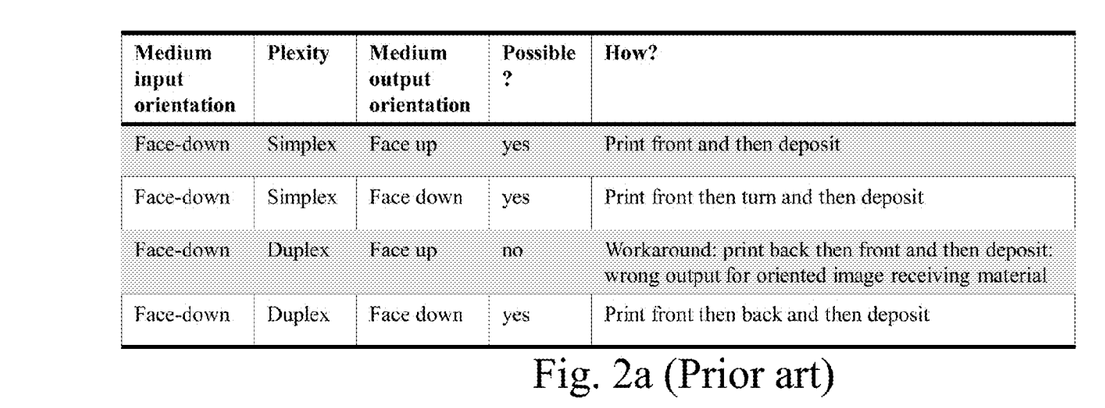
FIGS. 2a-2b are tables of input and output orientations of image receiving material according to the background art.
Figure 2B:
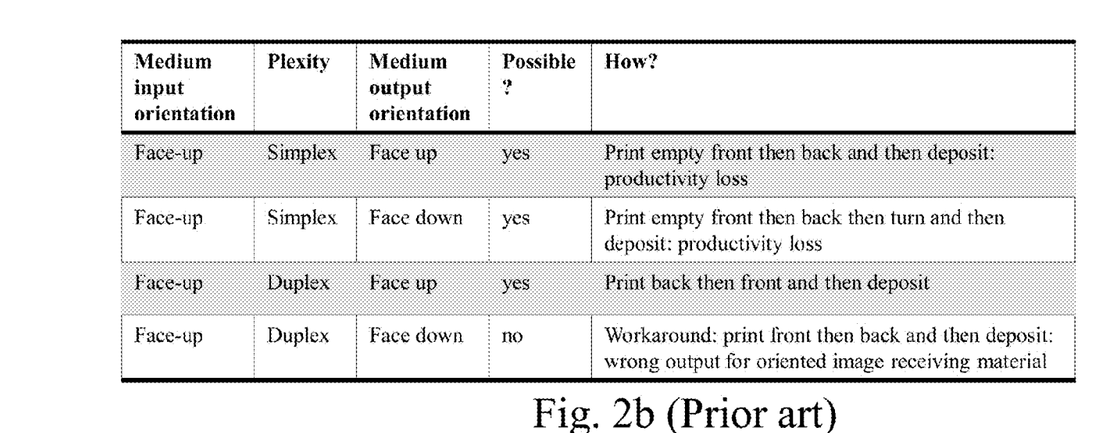

It is also noted that according to FIG. 2a and FIG. 2b, a simplex job can be printed when the facial orientation of the image receiving material is face down, as well as when the facial orientation of the image receiving material is face up. Since the image receiving material is present in the input holders in both a face up and a face down orientation according to the method of the present invention, the control unit can select from both input holders in case of simplex printing. This is in particular advantageous when printing a simplex job and one of the input holders becomes empty. Immediately, the printing system can switch to another input holder with another facial orientation of the sheets than the facial orientation of the sheets which were in the originally used input holder.

The control unit has the orientations of the image receiving material in each input holder stored in memory for the further print jobs and is configured to select the suitable input holder—input holder 46 or 44—for completing the printing of one or more sheets according to the print specifications. The print specifications comprise the plexity mode of the printing process of the sheet—simplex mode or duplex mode or mixplex mode—and the output orientation of the printed sheet to be delivered in the output holder. The output orientation of the printed sheet when it leaves the print engine and control section 3 of the printing system—in FIG. 1 and FIG. 5 just before the inlet 53—is for example important, if another output holder module is coupled to the print engine and control section of the printing system.

Figure 7:
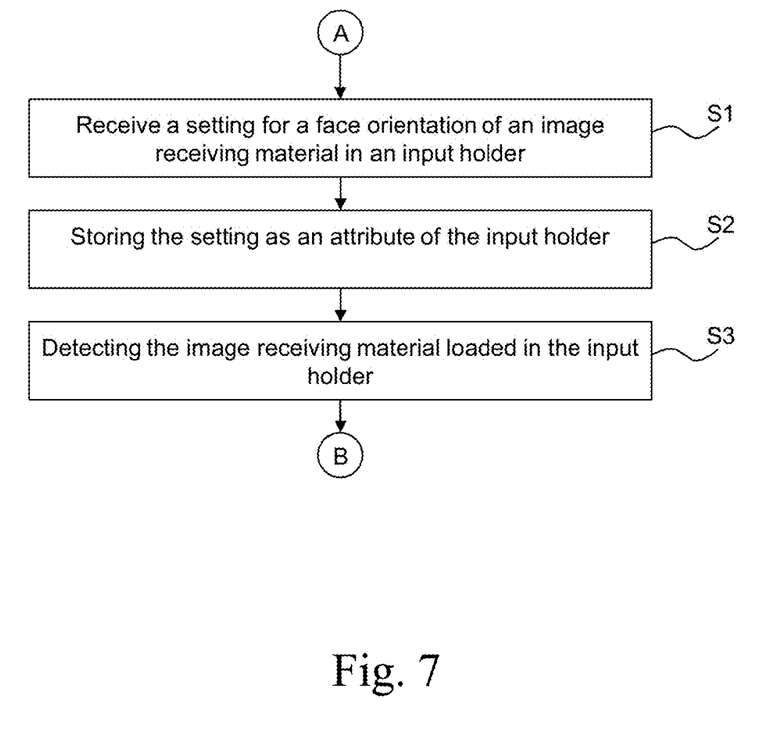
FIG. 7 is a first flow diagram of a method according to the present invention.

FIG. 7 is a first flow diagram of a method according to the present invention.

According to a first step S1 of the method, a setting for a facial orientation of an image receiving material in an input holder is received by means of the user interface. The user or operator may enter this setting for a facial orientation being one out of a face up orientation and a face down orientation. The setting may be entered just before loading the image receiving material in the input holder or directly after loading the image receiving material in the input holder. In case of pre-printed, pre-punched, or perforated image receiving material, a sensor in the input holder may detect the facial orientation. In the latter case, the setting of the facial orientation is based on the detected facial orientation. In an additional step, an indication that a loaded image receiving material is an oriented image receiving material is received by means of the user interface of the printing system.

In a second step S2, the setting of the facial orientation is stored in the memory of the control unit of the printing system as an attribute of the at least one input holder. Another attribute of the input holder is the kind of image receiving material loaded in the input holder. The kind of the image receiving material may comprise a quality, a use, a size, a weight and a pre-processing of the image receiving material. The pre-processing of the image receiving material may be pre-printed, pre-punched, pre-perforated or a combination of at least two pre-processes.

In a third step S3, the printing system detects that the image receiving material is loaded into the input holder. The detection may be done by a sensor in the input holder or by a sensor that registers the closing of the input holder after loading the image receiving material.

The first flow diagram in FIG. 7 is directed to registration of the facial orientation of sheets loaded or to be loaded in an input holder of the printing system. The same first flow diagram is mutatis mutandis applicable for registration of the header orientation and the LEF/SEF orientation of the sheets.

Figure 8:
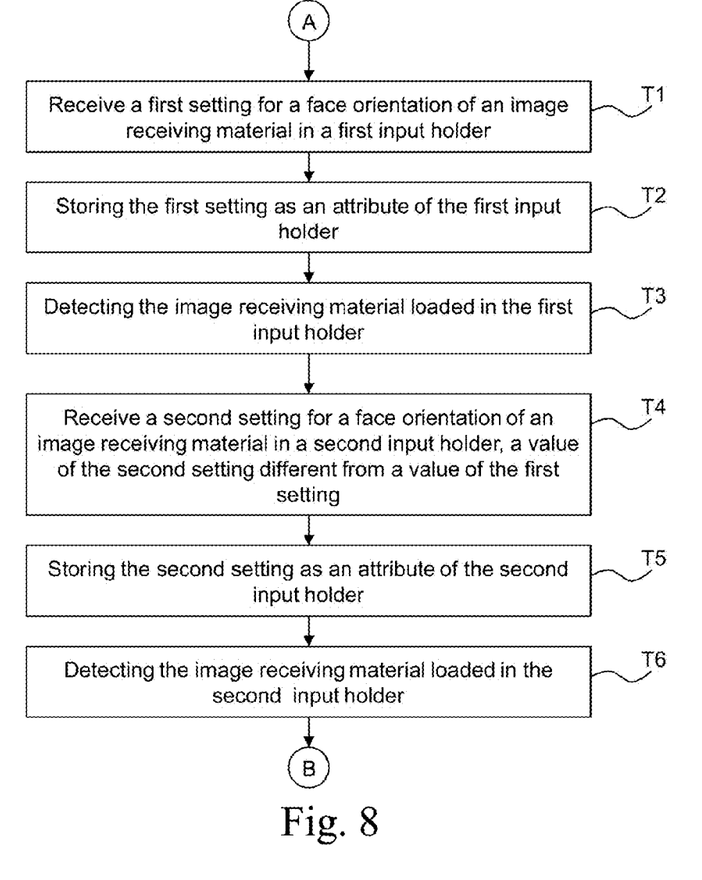
FIG. 8 is a second flow diagram of a method according to the present invention.

FIG. 8 is a second flow diagram of a method according to the present invention.

According to a first step T1 of the method, a first setting for a facial orientation of an image receiving material in a first input holder is received by means of the user interface. The user or operator may enter this first setting for a facial orientation being one of a face up orientation and a face down orientation. The first setting may be entered just before loading the image receiving material in the first input holder or directly after loading the image receiving material in the first input holder. In case of pre-printed, pre-punched, or perforated image receiving material, a sensor in the first input holder may detect the facial orientation. In the latter case, the first setting of the facial orientation is based on the detected facial orientation.

In a second step T2, the first setting of the facial orientation is stored in the memory of the control unit of the printing system as an attribute of the first input holder. Another attribute of the first input holder is of course the kind and size of image receiving material loaded in the first input holder.

In a third step T3, the printing system detects that the image receiving material is loaded into the first input holder. The detection may be done by a sensor in the first input holder or by a sensor that registers the closing of the first input holder after loading the image receiving material.

According to a fourth step T4 of the method, a second setting for a facial orientation of an image receiving material in a second input holder is received by means of the user interface. The user or operator may enter this second setting for a facial orientation being different from the first setting received in step 1 for the first input holder. If the facial orientation for the first input holder is face up, then the facial orientation for the second input holder is face down. If the facial orientation for the first input holder is face down, then the facial orientation for the second input holder is face up. The second setting may be entered just before loading the image receiving material in the second input holder or directly after loading the image receiving material in the second input holder. In case of pre-printed, pre-punched, or perforated image receiving material, a sensor in the second input holder may detect the facial orientation. In the latter case, the second setting of the facial orientation is based on the detected facial orientation.

In a fifth step T5, the second setting of the facial orientation is stored in the memory of the control unit of the printing system as an attribute of the second input holder. Another attribute of the second input holder is of course the kind and size of image receiving material loaded in the second input holder.

In a sixth step T6, the printing system detects that the image receiving material is loaded into the second input holder. The detection may be done by a sensor in the second input holder or by a sensor that registers the closing of the second input holder after loading the image receiving material. The method ends in an end point B.

The second flow diagram in FIG. 8 is directed to registration of different facial orientations of sheets loaded or to be loaded in two input holders of the printing system. The same second flow diagram is mutatis mutandis applicable for registration of the header orientation and the LEF/SEF orientation of the sheets in the two input holders.

In another embodiment of the method, information about the image receiving material is comprised in a digital data list of image receiving materials, and the method comprises the step of storing the setting of the facial orientation in the digital data list as an attribute of the image receiving material. Also, the settings of the LEF/SEF orientation and of the header orientation may be stored in the digital data list as an attribute of the image receiving material.

Figure 9:
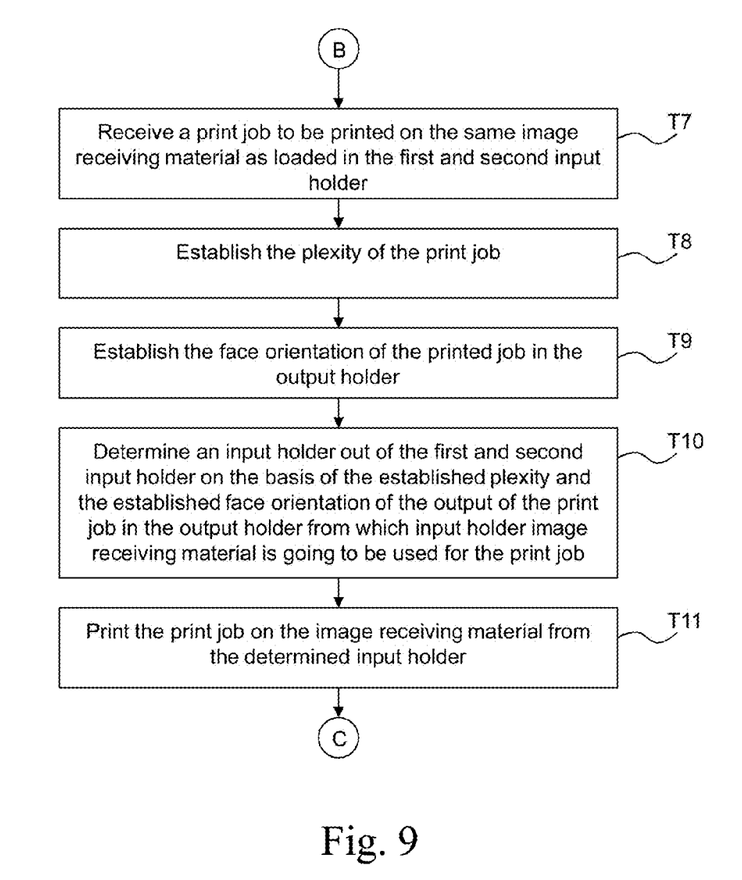
FIG. 9 is a third flow diagram of a method according to the invention.

FIG. 9 is a third flow diagram of a method according to the present invention. This method comprises all steps T1-T6 of the previous embodiment and continues at the end point B as shown in FIG. 7 and FIG. 8.

The method is particularly suitable when printing on a rectangular oriented image receiving material. The front and rear side of a sheet of such an image receiving material have the same rectangular outline shape and may be loaded in the input holder face up or face down. However, the front side and the rear side of the sheet may differ in what is pre-printed on the respective sides—for example a pre-printed sheet, logo papers, etc.—, may differ in punch hole positions in case of asymmetrically pre-punched image receiving material or asymmetrically perforated image receiving material, may differ because the image receiving material is coated on one side of the sheet, or may have a color on the front side that is different from the color on the rear side. Even when the front side and the rear side of a sheet may look the same for the user or operator, the front side and the rear side may be different with respect to the behavior of ink or toner put on the front or rear side during the printing process. For example, the blotting of ink may be different on the front side and the rear side. Such a difference in behavior may be a result of the production process of a sheet or stack of sheets in a paper mill or may be different for different batches of paper sheets produced in the paper mill. Due to a difference in the front side and the rear side of a sheet of image receiving material, it becomes important in which facial orientation the image receiving material is loaded in the input holder of the printing system.

In a seventh step T7, a print job to be printed on the same oriented rectangular image receiving material as loaded in the first and second input holder is received.

In an eighth step T8, a plexity—a simplex print job or a duplex print job—is established. Usually, the plexity is specified in the print job specifications in a print job ticket.

In a ninth step T9, a specified output facial orientation is established of the printed image receiving material in the output holder, when the print job is printed.

In a tenth step T10. an input holder is determined out of the first and second input holders on the basis of the established plexity of the print job and the established output facial orientation of the printed image receiving material in the output holder from which determined input holder of the first and second input holders the oriented rectangular image receiving material is going to be used for printing the print job. In cases where both facial orientations are needed to complete the print job, both the first input holder is determined for a first part of the print job and the second input holder is determined for a second part of the print job.

In a eleventh step T11, the target document specified in the print job is printed on the oriented rectangular image receiving material from the determined input holder. The method ends in an end point C.

In a further embodiment, the method comprises the additional steps of displaying a warning by means of the user interface of the printing system, if the determined input holder of the first and second input holders contains an amount of the oriented rectangular image receiving material, which amount is insufficient for completing the print job or the oriented rectangular image receiving material is not present in the determined input holder. The user or operator has the opportunity to load additional image receiving material in the determined input holder. An electronic signal is received by the control unit of the printing system that a sufficient amount of oriented rectangular image receiving material has been loaded in the determined input holder for completing the print job. After the electronic signal is received, the print job may start.

The warning comprises a fill receipt with respect to the facial orientation for filling the determined input holder with the appropriate image receiving material.

The method according to the present invention may also be applied to individual sheets of a print job. This is particularly useful when the print job has a mixed plexity, meaning that the print job is specified to be partly printed in a simplex mode and to be partly printed in a duplex mode.

The present invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for loading image receiving material in a printing system, the printing system comprising a print engine capable of printing on the image receiving material, a control unit configured to control the printing on the image receiving material, a plurality of input holders for loading the image receiving material, the plurality of input holders comprising a first input holder for loading the image receiving material and a second input holder for loading the same image receiving material, an output holder for outputting a printed image receiving material, and a user interface configured to interact with a user of the printing system, the method comprising the steps of:
    receiving, by means of the user interface, a first setting of a facial orientation of the image receiving material loaded or intended to be loaded in the first input holder;
    storing the first setting of the facial orientation as an attribute of the first input holder;
    detecting the image receiving material loaded in the first input holder;
    receiving, by means of the user interface, a second setting of the facial orientation of the image receiving material loaded or intended to be loaded in the second input holder;
    storing the second setting of the facial orientation as an attribute of the second input holder;
    detecting the image receiving material loaded in the second input holder,
    wherein a value of the first setting is different from a value of the second setting, and
    wherein the detected loaded image receiving material is a rectangular oriented image receiving material;
    receiving a print job to be printed on the same oriented rectangular image receiving material as loaded in the first and second input holder, the print job specifying a target document having a plexity and an output facial orientation of the printed image receiving material in the output holder, when the print job is printed;
    determining an input holder out of the first and second input holders on the basis of the specified plexity of the target document and the specified output facial orientation of the printed image receiving material in the output holder from which determined input holder of the first and second input holders the oriented rectangular image receiving material is going to be used for printing the print job; and
    printing the target document on the oriented rectangular image receiving material from the determined input holder,
    wherein information about the image receiving material is comprised in a digital data list of image receiving materials, the method further comprising the steps of:
    storing the setting of the facial orientation in the digital data list as an attribute of the image receiving material; and
    storing a setting indicating that the image receiving material is an oriented image receiving material in the digital data list as an attribute of the image receiving material,
    wherein the digital data list of image receiving materials is a media catalogue in memory of the printing system which media catalogue is independent from a tray assignment setting and independent from a print job setting.

2. The method according to claim 1, further comprising the steps of:
    displaying a warning, by means of the user interface of the printing system, if the determined input holder of the first and second input holders contains an amount of the oriented rectangular image receiving material, which amount is insufficient for completing the print job or the oriented rectangular image receiving material is not present in the determined input holder; and starting printing of the print job after receiving an electronic signal that a sufficient amount of oriented rectangular image receiving material has been loaded in the determined input holder for completing the print job, wherein the warning comprises a fill receipt with respect to the facial orientation for filling the determined input holder.

3. The method according to claim 1, further comprising the steps of:

for each input holder of the plurality of input holders receiving, by means of the user interface, a setting for a header orientation of an image receiving material in the input holder, the header orientation being one of a header up orientation and a header down orientation; and storing the setting of the header orientation as an attribute of the input holder.

4. The method according to claim 3, wherein information about the image receiving material is comprised in a digital data list of image receiving materials, the method further comprising the step of storing the setting of the header orientation in the digital data list as an attribute of the image receiving material.

5. A print system for printing an image on an image receiving material, the print system being configured to execute the method according to claim 1.

6. A non-transitory computer readable medium comprising computer executable program code configured to instruct a computer to perform the method according to claim 1.

* * * * *